J. S. BOYD.
ADJUSTING AND LOCKING DEVICE FOR SKID CHAINS.
APPLICATION FILED AUG. 5, 1913.

1,257,578. Patented Feb. 26, 1918.

WITNESSES
E. M. Callaghan
Myron G. Clear

INVENTOR
JAMES S. BOYD,
BY Munn & Co.
ATTORNEYS

UNITED STATES PATENT OFFICE.

JAMES S. BOYD, OF WEIR, TEXAS, ASSIGNOR OF ONE-HALF TO COOPER SANSOM, OF GEORGETOWN, TEXAS.

ADJUSTING AND LOCKING DEVICE FOR SKID-CHAINS.

1,257,578.　　　　Specification of Letters Patent.　　Patented Feb. 26, 1918.

Application filed August 5, 1913. Serial No. 783,079.

*To all whom it may concern:*

Be it known that I, JAMES S. BOYD, a citizen of the United States, and a resident of Weir, in the county of Williamson and State of Texas, have made certain new and useful Improvements in Adjusting and Locking Devices for Skid-Chains, of which the following is a specification.

My invention has to do with the anti-skid chains used upon automobile wheels and tires, my object being to provide a simple and effective adjusting and locking device whereby the chains may be adjusted upon tires of different sizes and readily and quickly locked to prevent slipping.

In its structure, my invention takes the form of a pair of longitudinally curved plates, each of these plates being provided at its outer end with a chain engaging hook, one of the plates being provided with a longitudinal series of openings and the other plate having a cam locking and adjusting lever so formed and engaged with the first plate that the lever is held in proper position in use by the various strains to which the locking device is subjected.

Figure 1:
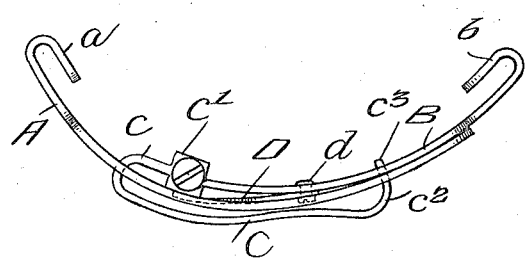
Figure 2:
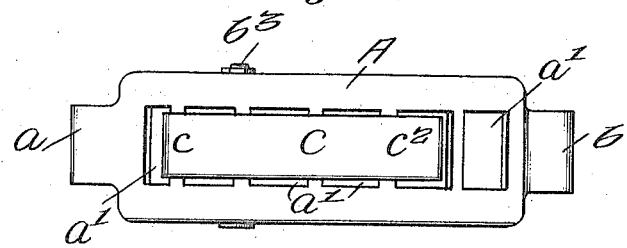
Figure 3:
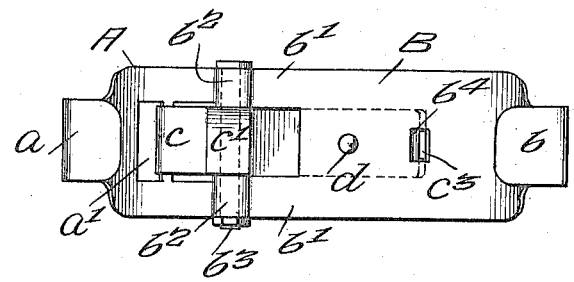
Figure 4:
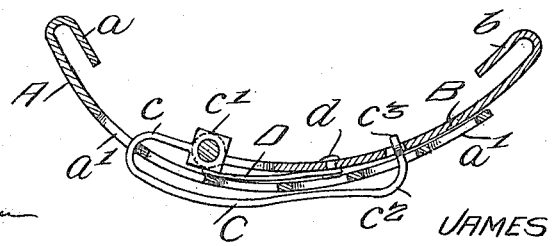

In the accompanying drawing which illustrates the adjusting and locking device forming my invention, Figure 1 is a side elevation illustrating the plates in engaged position, Fig. 2 is a bottom plan view of the same, Fig. 3 is a top plan view of the same, and Fig. 4 is a longitudinal section through the two plates in the position they are shown in Fig. 1.

Referring now to these figures, I provide a pair of longitudinally curved coöperating plates A and B respectively, provided at their outer ends with hooks $a$ and $b$, formed by reduced extensions bent back upon the concave side thereof.

The plate A is provided in its length with a series of spaced rectangular apertures $a'$ and adjustably laps the inner end of the plate B, the said inner end of the latter plate being longitudinally slotted to provide side extensions $b'$, at the extremities of which are formed bearings $b^2$ for a transverse pivot bolt $b^3$.

One end $c$ of the locking lever C is bent back thereon in spaced relation, and is provided at its extremity with a squared enlargement $c'$ through which is formed a transverse aperture, the said enlargement being disposed between the extension $b'$ and the aperture receiving the pivot pin $b^3$.

The opposite laterally bent end $c^2$ of the locking lever is provided with a reduced extremity $c^3$ for engagement within an intermediate slotted opening $b^4$ of the plate B which carries the lever.

Mud or other foreign matter collects upon the plate B and also in the openings of the plate A in use, so that upon relative adjustment of these plates it is frequently impossible to get the free end of lever C closely against the plate B and in locked position, without first cleaning off the plates. This occasions considerable trouble and requires considerable time when there are a number of the fasteners to be adjusted, and I therefore provide the lever with a reduced extremity at its free end as above mentioned and adapt it to move into the aperture in plate B to locked position, and to force any accumulated matter before it and through the said aperture, thus permitting the free end of the lever to be moved into locked position irrespective of any accumulated matter such as above mentioned.

Thus, when the plates are united by passing the free laterally bent end of the locking lever through a selected opening $a'$ of the plate A, closing movement of the lever will exert a cam action upon the plate A, to draw the plates tightly, and it will further be seen that when the lever is closed, as shown in the figures, with its reduced free end $c^3$ projecting through the intermediate opening $b^4$ of plate B, the strain is directed against the bent end $c$ of the lever and tends to prevent the same from opening.

Secured at one end upon the convex surface of the locking plate B, by means of a rivet $d$ or otherwise, is a spring D, the free end of which bears upon the squared extremity $c'$ of the locking lever, so that the latter may be held, when not under strain, in either an open, closed or intermediate position, thus facilitating the locking engagement of the plates when desired, and also serving to hold coöperative plates in engaged position and ready for instant use when desired.

I claim:—

1. In an adjusting and locking device of the character described, a pair of coöperating longitudinally curved plates, one of said plates being provided with a longitudinal series of openings, the other plate being provided with an intermediate opening and with a slot extending longitudinally thereof from its inner end and forming side extensions provided at their extremities with bearings, a locking lever having one end bent back thereon in spaced relation and provided with a squared extremity extending between the said extensions, a pivot bolt extending through the bearings and the said squared end of the locking lever, the opposite end of said lever being bent laterally and provided with a reduced extremity for engagement within the intermediate opening of the plate to which it is pivoted, and a spring secured at one end upon the last mentioned plate and having its free end bearing upon the squared extremity of the locking lever, all for the purpose described.

2. An adjusting and locking device of the character described, comprising a pair of longitudinally curved locking plates, one of said plates having a longitudinal series of apertures, the other plate having an intermediate opening and a transverse pivot bolt at its inner end, and a locking lever having one end bent back thereon in spaced relation and pivotally mounted on the said locking bolt and having its opposite end bent laterally and provided with a reduced extension for engagement within the intermediate opening of its plate when closed, all for the purpose described.

JAMES S. BOYD.

Witnesses:
OTTO G. RAUM,
CHARLES F. MILLER.

Copies of this patent may be obtained for five cents each, by addressing the "Commissioner of Patents, Washington, D. C."